(12) United States Patent
Pung et al.

(10) Patent No.: US 6,543,604 B1
(45) Date of Patent: Apr. 8, 2003

(54) BLANK FOR PLYWOOD

(75) Inventors: Steve Pung, Black Mountain, NC (US); Larry Krinn Evans, Marion, NC (US)

(73) Assignee: Columbia Forest Products, Inc., Portland, OR (US)

(*) Notice: Subject to any disclaimer, the term of this patent is extended or adjusted under 35 U.S.C. 154(b) by 0 days.

(21) Appl. No.: 09/816,591

(22) Filed: Mar. 24, 2001

(51) Int. Cl.[7] .............................................. B65G 47/00
(52) U.S. Cl. ................................... 198/468.4; 414/797
(58) Field of Search ........................ 414/788.8, 790.6, 414/746.5, 797; 198/468.4

(56) References Cited

U.S. PATENT DOCUMENTS

| | | | | |
|---|---|---|---|---|
| 3,884,368 A | * | 5/1975 | Ballard | 414/797 |
| 4,565,478 A | * | 1/1986 | Ericsson | 414/797 X |
| 4,950,128 A | * | 8/1990 | Sala | 198/468.4 X |
| 5,174,712 A | * | 12/1992 | Focke et al. | 414/796.5 |
| 5,507,616 A | * | 4/1996 | Perobelli et al. | 414/797 X |
| 6,179,549 B1 | * | 1/2001 | Hayakawa | 414/797 X |

FOREIGN PATENT DOCUMENTS

| | | | | |
|---|---|---|---|---|
| DE | 2039860 | * | 2/1972 | 414/797 |
| DE | 2411299 | * | 9/1975 | 414/797 |

* cited by examiner

*Primary Examiner*—James R. Bidwell
(74) *Attorney, Agent, or Firm*—Robert L. Harrington; Schwabe Williamson & Wyatt (57) ABSTRACT

A system for producing blanks for finish plywood which includes development of a recipe of selected veneer sheets, automatically and rapidly, e.g., via linear actuator, arranging the selected veneer sheets for sequential stacking and bonding of the sheets to produce a rough blank having a determined thickness that enables minimal and sufficient abrasive planing.

9 Claims, 6 Drawing Sheets

BLANK FOR PLYWOOD

FIELD OF THE INVENTION

This invention relates to the production of plywood sheets used for cabinet making and the like and more particularly it relates to the production of blanks, i.e., a composite of several wood veneer sheets to which finish or facing sheets are applied.

BACKGROUND OF THE INVENTION

Plywood sheets as contemplated for this invention consist of multiple veneer sheets, a typical number being seven sheets, that are glued together to produce a plywood sheet, e.g., a ¾ inch thick sheet that is 4 feet wide and 8 feet long. The outer or facing sheets of veneer are high quality hardwood that provide a decorative appearance. The inner sheets can be a variety of wood species and provide structural integrity. Hereafter it is to be understood that reference to plywood production applies to such plywood sheets having decorative facing and is used to produce cabinetry and the like as opposed to plywood used for construction, i.e., a base sheet for roofing (to which shingles are applied) or flooring (to which carpeting may be applied) and the like.

A plywood manufacturer has in the past produced plywood in a continuous assembly line operation wherein multiple veneer sheets are essentially glued, stacked, pressed, trimmed and then sanded. More recently there have been attempts to separate the process into two stages. One stage is the lamination of the inner ply sheets to form what is referred to as a blank, with the second stage merely applying the facing sheets to the opposed sides of the blank. This separation of the process provides both advantages and disadvantages. The facing sheets which are substantially more expensive than what is required for the inner sheets (the blank) can be much thinner than the inner sheets as long as sanding is held to a minimum, e.g., limited to polishing. Further, the blanks can be produced as a common plywood core to which different decorative facing sheets are applied, e.g., oak, alder, birch, maple, etc. To benefit from the advantages as explained for separating the process, the blank needs to be produced to very exacting tolerances and at a low cost. Prior to this invention, the process of blank production has required substantial manual operations that are cost prohibitive and it is an objective of the present invention to produce the blanks at a reduced cost through automation of the process.

DESCRIPTION OF THE INVENTION

A criteria for the blank production is that the outer plies are substantially free of irregularities such as cracks or niches or whatever that may affect the final appearance after a paper thin sheeting of facing veneer is applied. Accordingly, in the initial assembly process, the outer plies of the blank are selected by grade and are generally of higher quality with respect to such defects than the inner plies of veneer.

As a second criteria for this assembly process, because the veneer sheets are produced from wood which has grain direction, and in accordance with industry practice, the plies or sheets are laid up to have alternating grain direction. Still further to enable dimensioning of the blank in the finish operation where the blank is sanded (abrasive planing) the assembled sheets for the blank are required to have an overall thickness that exceeds the desired end thickness. It is, however, further desired that the added thickness not result in unnecessary waste. It has been determined that the desired added thickness to enable efficient dimensioning is about 0.040 inch. The veneer sheets are provided with varying thicknesses (e.g., $\frac{1}{10}$ inch, $\frac{1}{6}$ inch and $\frac{1}{7}$ inch) to enable assembly to the desired thickness.

It will accordingly be appreciated that the sequencing of the sheets is a complex operation. A plurality of stacks of veneer sheets are provided, with the sheets of each stack being similar in grade, grain direction and thickness and the different stacks achieving a desired mix of these properties. For a particular blank, the two outside sheets are to be the better quality. The combined thicknesses of the sheets in whatever order is to exceed the desired end thickness by 0.040 inch. The assembly of sheets is to have alternating direction of grain.

As for example for the production of a five sheet blank, the assembly procedure requires the stacking of four sheets (the bottom sheet being a high quality sheet) with each sheet having its upper side coated with glue and then adding an unglued top sheet to the stack (also a high quality sheet). For this preferred embodiment, four sheets of the five sheet blank are selected and placed on a conveyor in the desired sequence (the first sheet being an outside sheet, the second, third and fourth sheets having alternating grain direction, the fourth sheet having a grain direction opposite to the top sheet, and the four sheets when combined with the top sheet having the desired thickness). Providing this desired sequence (for the preferred embodiment) is achieved using a plurality of feeder machines (e.g., four machines sometimes referred to as robots) each of which is directed by computer control to a stack of the sheets and, in the desired sequence, lays the sheets on a conveyor.

It is important that these feeder machines operate without error. Previous machines used for a somewhat similar purpose included overhead conveyors where the top sheet of a stack was pulled upwardly to the conveyor by suction and conveyed to the conventional bottom supporting conveyor belt. However, such transfer mechanisms were not able to achieve the desired error free transfer. The feeder machines otherwise available included a carrier member having a plurality of suction cups. The suction cups are lowered onto a stack of veneer sheets and grip the sheets and roboticly move sheets one by one to the assembly line conveyor. Such machines were prone to misfeeding and were too slow. The misfeeding of the sheets can be explained in part by an appreciation that the sheets that are laid in the stack present an undulating surface to the suction members (cups) and because the sheets have defects, (cracks, etc.), the suction members that are positioned over a defect or undulation often fail to produce the required air tight grip. These problems were addressed for the present invention by using smaller and greater number of suction cups. The heads include (in the preferred embodiment) as many as 50 or more cups arranged in five rows of 10 cups each. Each cup can adjust to different surface heights and each cup is designed to conform to undulations. Only about half the number of working cups applied are needed to consistently grip and transfer the sheets and whatever the defect in a given sheet (a sheet considered acceptable for such plywood production), there are sufficient suction cups not affected to achieve gripping.

The desired speed of the transfer machines is achieved by use of multiple carriers or gripping heads (e.g., four) and then the use of linear actuator for moving the carriers from the stack to the conveyor. The four gripping carriers are individually and cooperatively lowered onto the selected stacks to grip and remove the top sheet off each stack which are then rapidly moved to the conveyor by the linear actuator to be released onto the conveyor in rapid error free succession. The above operation of the robots is controlled by a computer which directs each carrier to the desired stack in the desired sequence, the sequencing of the sheets referred to as the recipe of the blank.

Following laying of the sheets onto the conveyor, the sheets are conveyed through a glue application station, assembled into five sheet stacks in accordance with the sequence as presented by the conveyor, (such assembly referred to as a rough blank) and thereafter cured, trimmed and sanded, e.g., in accordance with industry practice. The invention here is directed to the assembly process whereby the sheets are arranged in a desired sequence and deposited onto a conveyor for presentation to a lay up station where the sheets, following glue application, are assembled into a rough blank.

The production of the rough blank will be more fully understood upon reference to the following detailed description having reference to the accompanying drawings.

BRIEF DESCRIPTION OF THE DRAWINGS

FIG. 2 and sub

DETAILED DESCRIPTION OF THE DRAWINGS

Figure 1:
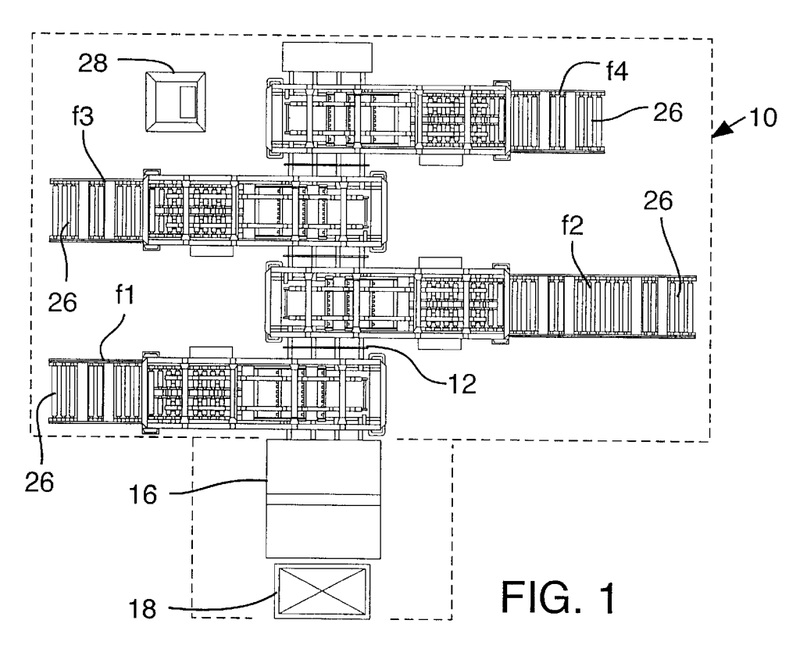
FIG. 1 is an overview of the process for producing rough blanks in accordance with the present invention.

FIG. 1 is a composite view that encompasses the assembly operation for producing rough blanks in accordance with the present invention. Included in this operation is the set up step 10 whereat the veneer sheets are selectively deposited onto a set up conveyor 12 and lay up step 14 which involves the application of glue to the top surface of the veneer sheets at a glue station 16 and then stacking the sheets at stacking station 18 to produce the rough or unfinished blank. The rough blanks are then directed into the various stages of curing and finishing to produce completed blanks ready for storage and/or shipment. These latter stages can be readily achieved for the rough blanks of the present invention using known processing steps and are not disclosed herein.

In FIG. 1, illustrated is four sheet feeders $f_1$, $f_2$, $f_3$, and $f_4$ for feeding sheets from veneer stacks onto set up conveyor 12. The sheets are required to be laid onto the conveyor in a desired sequence. That is, the lead off sheet will be the bottom sheet of the stack of sheets that will make up a rough blank and its bottom face will be one of the exposed faces of the completed blank. It needs to be of a desired quality, i.e., less surface defects than as allowable for the center sheets (there being three center sheets in a five sheet blank). The top sheet is provided from a single stack of sheets (not shown) located at the stacking station 18 and this top sheet does not receive a glue application. The thickness of the five sheets (for a five sheet blank) is selected to produce a combined thickness that exceeds the desired finished blank thickness, e.g., by 0.040 inch, this to allow sanding or abrasive planing. Accordingly, there are four stacks of sheets provided on the four infeed conveyors 26 of feeders $f_1$, $f_2$, $f_3$, and $f_4$ which, when combined with the top sheet generates the desired rough blank thickness.

The stack of sheets provided for feeder $f_1$ in addition to being a determined thickness is the lead sheet and accordingly is of higher quality. Additionally the sheets are presented so as to provide alternating grain direction. These requirements are all considered when generating a desired "recipe" for the blank preferably produced from a computer program by computer 28.

Whereas the above example contemplates a five sheet blank, it will be appreciated that a three, seven or nine sheet blank can be produced from this set up. That is, for example, sheets are simultaneously laid onto the set up conveyor 12 by the four feeders $f_1$, $f_2$, $f_3$, and $f_4$ followed by repeat placing of a second sheet from feeders $f_2$, and $f_3$, which sequentially follow the sheet placement of feeder $f_4$. Thus, with placement of a top sheet onto the stack, the stack is a seven sheet blank rather than a five sheet blank. For a three sheet blank, only one of the feeders $f_1$, $f_2$, $f_3$, and $f_4$ would be used. Other combinations are possible including the provision of additional feeders. Still further is the alternative of using an even number of plies, e.g., an eight ply blank. In such a case, the two center sheets are adhered together with the grain direction parallel and then the subsequent outer sheets having alternating grain direction (resulting in the two outside plies having the same grain direction).

Figure 2:
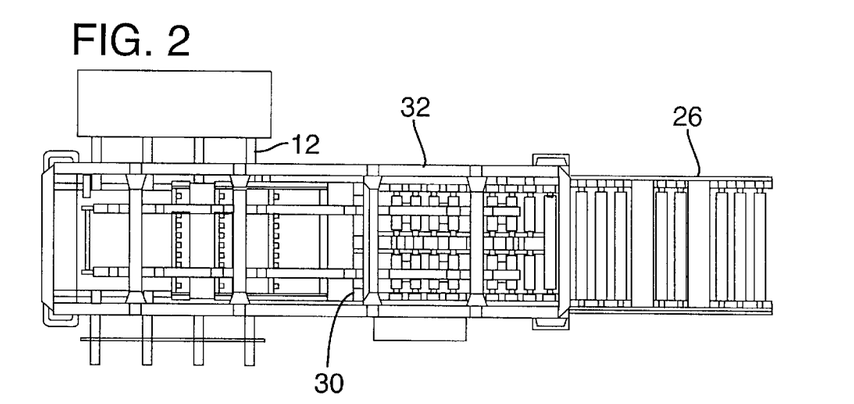
Figure 2A:
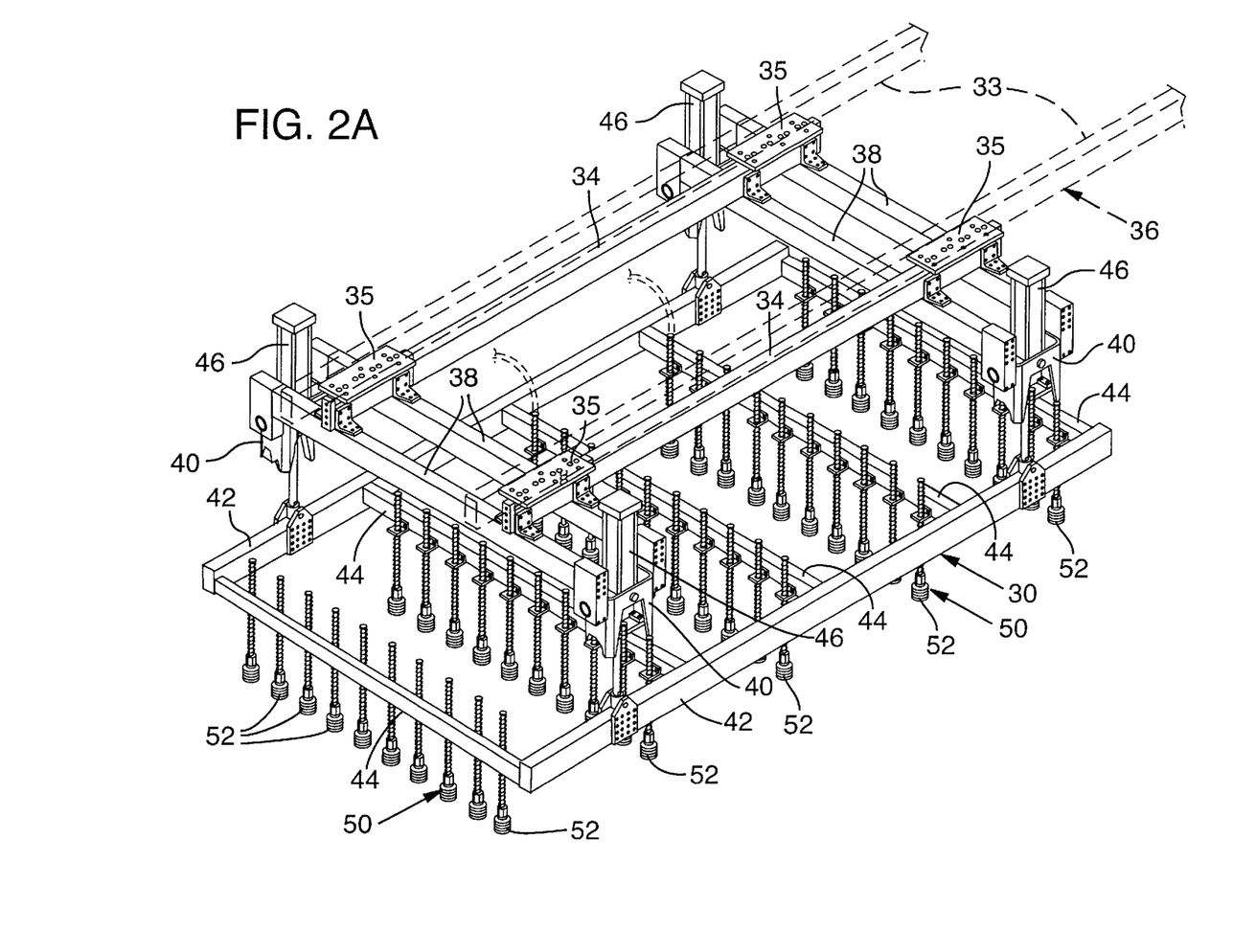
FIGS. 2A–2H depict the veneer sheet feeder assembly and sub-components.
Figure 2B:
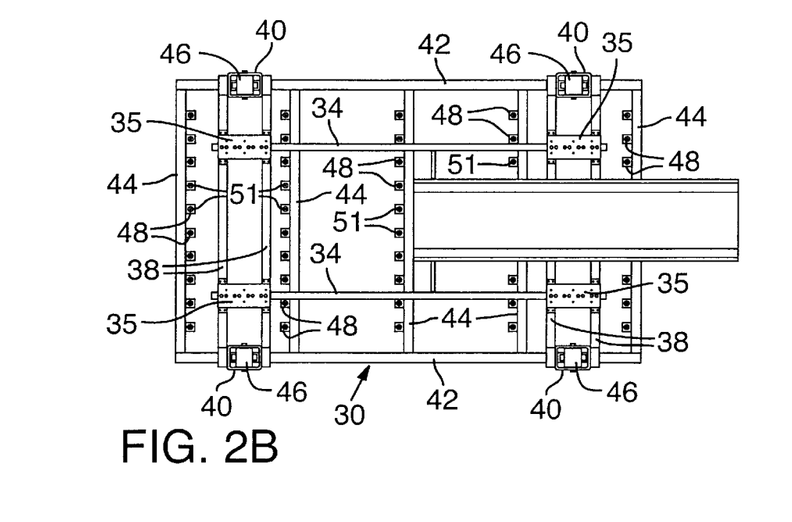
Figure 2C:
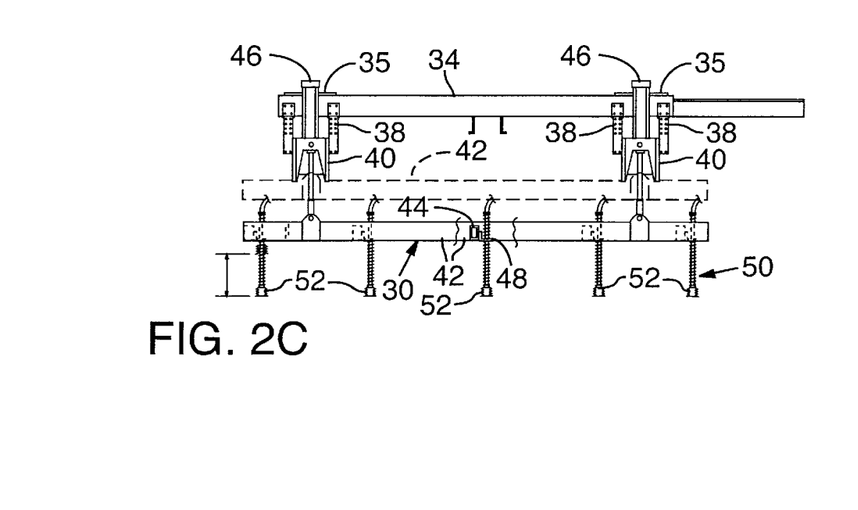
Figure 2D:
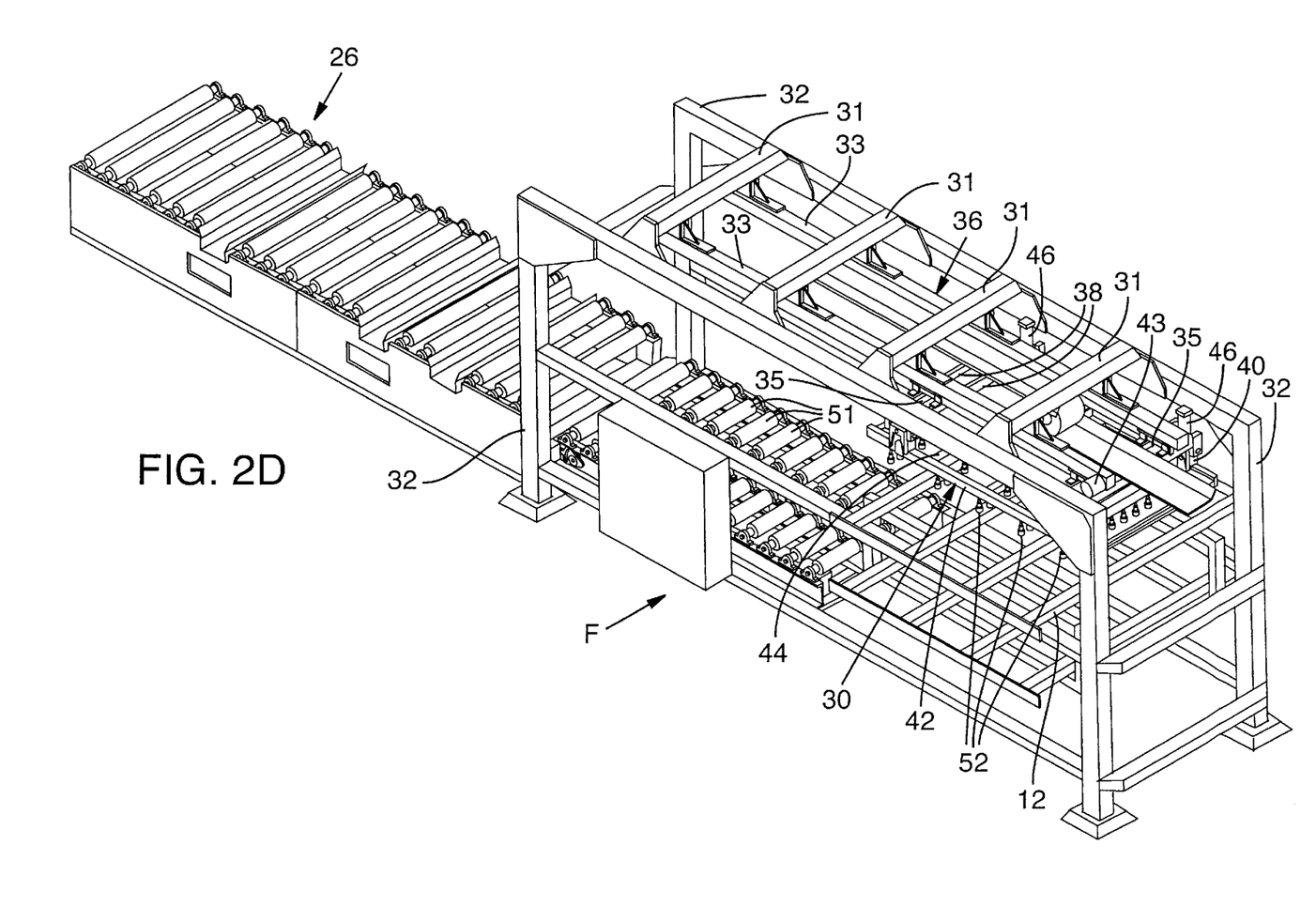
Figure 2E:
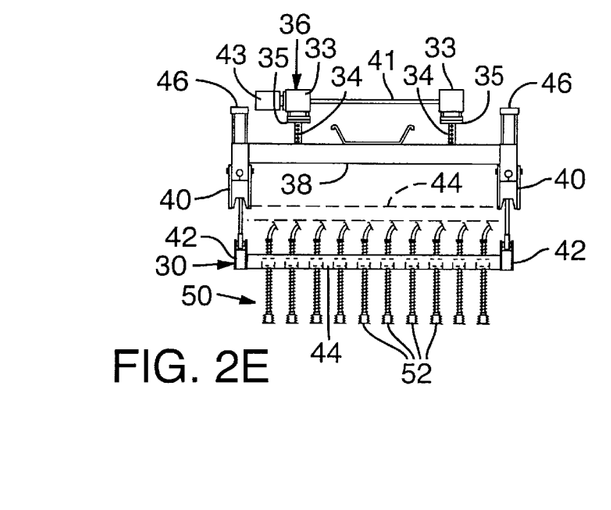
Figure 2F:
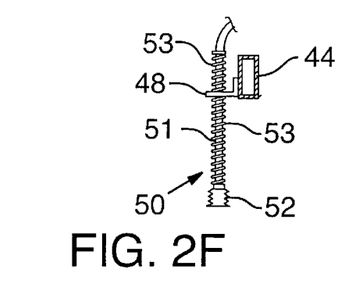
Figure 2G:
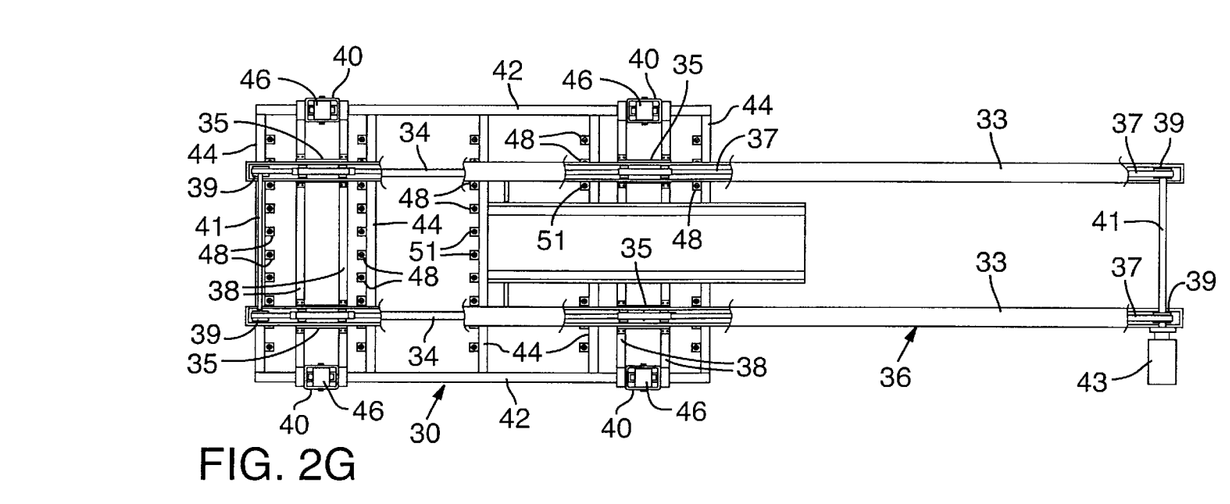
Figure 2H:
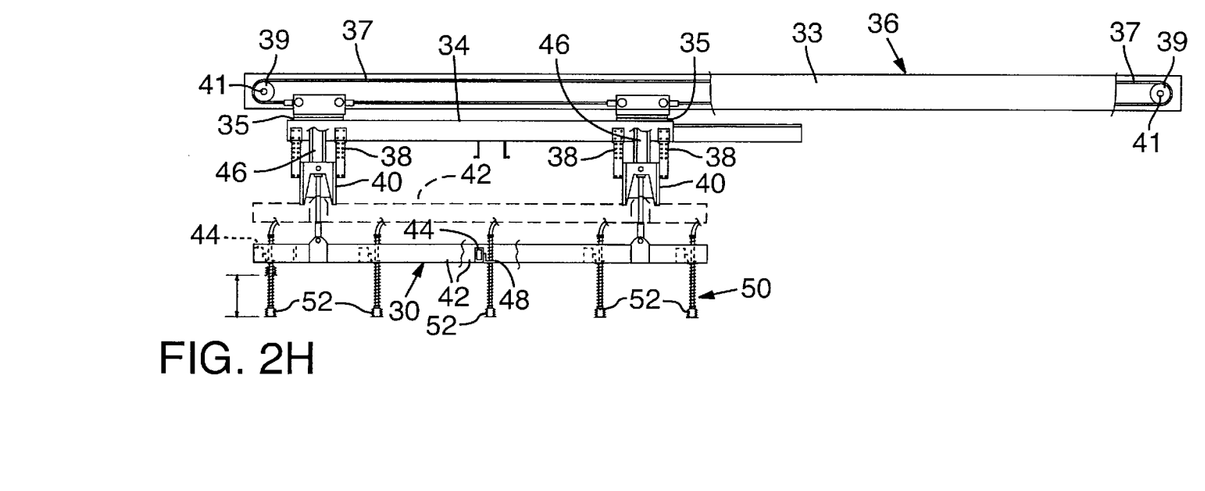

The feeders $f_1$, $f_2$, $f_3$, and $f_4$ are more clearly illustrated in FIG. 2 and sub-FIGS. 2A–2H. FIG. 2A illustrates a carrier 30 and FIG. 2D illustrates the carrier 30 mounted to an overhead structure 32 of the feeder f. The carrier 30 is secured via mounting plates 35 to a linear actuator 36 illustrated more fully in FIGS. 2G and 2H.

The linear actuator 36 includes spaced apart guide tubes 33 in which a carrier belt 37 resides. The belt 37 is entrained on sprockets 39, the end pairs of which are joined by axles 41. One of said axles 41 (right side of FIG. 2G) extends through a guide tube and connects to a drive motor 43. The carrier 30 is attached to the carrier belts 37 via mounting plate 35 and reverse driving of the axle 41 (connected to motor 43) moves the carrier 30 back and forth along the guide tubes 33. The guide tubes 33 are mounted between the upper beams 32 and to overlying cross braces 31 (with specific reference to FIG. 2D).

With reference to the carrier only shown in FIG. 2A, the plates 35 are mounted to support beams 34. Suspended from the beams 34 are cross supports 38. Mounted to the supports 38 at each side thereof are suspension members 40 having extendable pistons 46. Side rails 42 are secured to the extendable pistons 46 for raising and lowering the rails 42 (e.g., a distance of 10 inches). Cross bars 44 (a total of five) extend between the rails 42 and are raised and lowered accordingly. As shown in FIG. 2D, the carrier 30 is mounted over the location of conveyor 12 (indicated by reference arrow but not shown) as when releasing a sheet of veneer onto the conveyor. The stack of sheets is to be located on the roller supports 51 which are mounted on a scissor lift to maintain a desired height. On return of the carrier 30 to the location of support 51, the carrier is lowered onto the stack by actuation of suspension members 40. When lowered, the carrier 30 including rails 42 and cross bars 44 will lower down to the stack of veneer at the approximate location of the top most sheet on the stack. A known device providing the function of the suspension members 40 is Norgren EA7R-77B1-PS3¼×10 cylinder with magnetic reed switch indication.

Mounted to the cross bars 44 are grippers 50 consisting of suction tubes 51 to which bellows cups 52 are secured. (See FIG. 2F) The tubes 51 slide through bushings 48 secured to cross bars 44. Coil springs 53 on each side of the bushings 48 secure the tubes to the bushings while permitting resilient adjustment vertically of the tubes 51 and cups 52, e.g., a distance of 6–8 inches. The bellows cups 52 engage and conform to the irregular surfaces of the sheet as necessary as the tubes adjust to height variation to insure an air tight gripping of the sheet by the grippers 50. A total of ten grippers 50 are mounted to each of the five cross bars 44.

In practice, a stack of sheets is placed on the feeder conveyor 26 (FIG. 2D) and conveyed on the conveyor to a position on the scissors lift roller support 51. As controlled by the computer 28, the suspension members 40 (FIG. 2A) are activated to lower the structure including rails 42 and bars 44 (carrying the grippers 50) down to the top sheet on the stack and the grippers 50 individually adjust to the surface irregularities. A vacuum is drawn through the grippers 50 to draw the sheet against the bellows cups 52. The structure (rails 42, bars 44) is then raised to also lift the top sheet from the stack. The linear actuator 36 (FIG. 2D) is activated to transfer the sheet to a position over the conveyor 12. At this point, the air flow to the grippers 50 is reversed and positive air flow ejects the sheets from the grippers and onto the conveyor 12. The rapid air assisted transfer of the sheets to the conveyor minimizes the chance for shifting of the sheets due to "float" from the grippers to the conveyor and also clears the air passages of the grippers of any debris that may have been drawn into the grippers via the vacuum. All of this activity again is controlled by the computer 28 and is in sync with the other feeders to sequentially position the desired sheets onto the conveyor 12. The use of servo-powered, belt driven linear modules is considered important to the processing of the sheets at a speed desirable for cost efficient operation.

Figure 3:
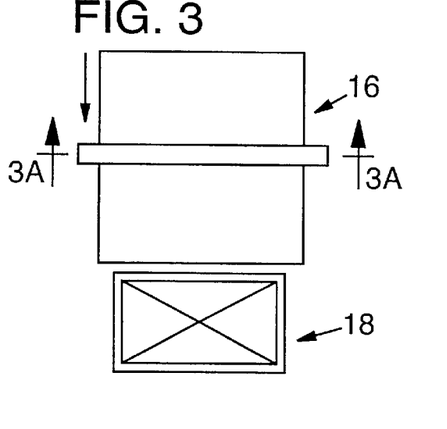
FIG. 3 and FIG. 3A depict glue application and the assembly procedure following glue application.
Figure 3A:
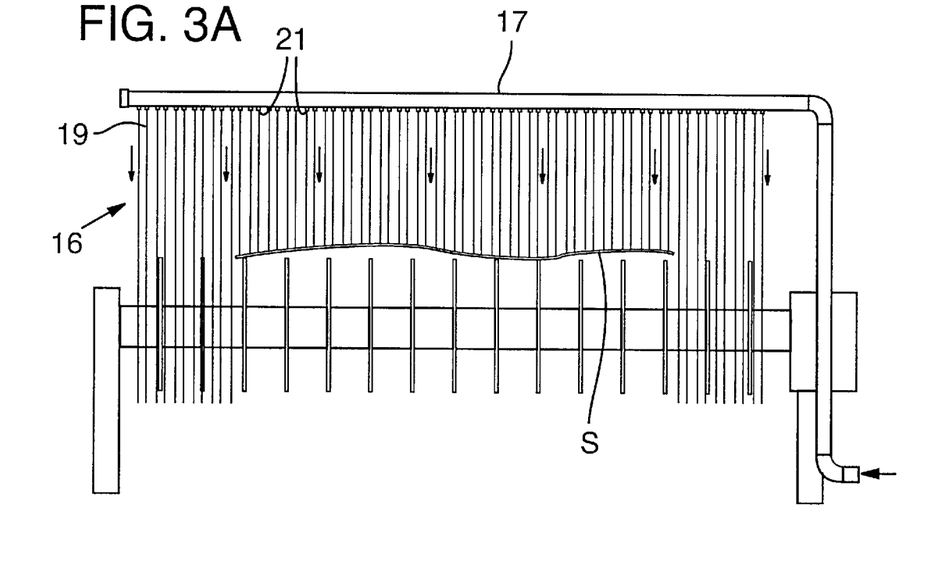

Reference is now made to FIGS. 3 and 3A which illustrate the glue application and lay up. Veneer sheets laid on the set up conveyor 12 are conveyed through the glue station 16. FIG. 3A illustrates the manner in which glue is applied to a veneer sheet S. Glue, such as used for finished plywood, is not provided with a viscosity that permits laying a curtain of glue on a veneer sheet. Typically such glues are applied with rollers that are set at a specific height to effectively wipe the glue onto the sheet. This does not accommodate the different sheet thicknesses of the present invention. To accommodate the thickness variation, the glue is conveyed to an overhead extruding tube 17 whereat strings of glue 19 are extruded downwardly through extrusion nozzle 21 onto veneer sheets S passing under the tube 17. The glue strings form closely spaced parallel beads of glue on the surface of the sheet which are spread into an even layer of glue upon customary prepressing of the blanks following assembly.

As the sheets emerge from the glue application station 16 (FIG. 3), they are stacked at stacking station 18. The sheet of feeder $f_1$ is positioned (e.g., against positioning rails provided at station 18) and each subsequent sheet in turn (from feeders $f_2$, $f_3$, and $f_4$) is laid on top in sequence with a final non-glued sheet as the top sheet provided from a stack located adjacent station 18 (e.g., located under the output end of glue applicator 16) to complete a five sheet rough blank. Multiple rough blanks are laid up one on top of the other in station 18 until, e.g., a stack of 24 rough blanks are created. The support that holds the blanks at station 18, e.g., a scissors lift, will gradually lower to provide a constant height for the operator during the stacking operation.

Numerous variations will become apparent to those skilled in the art without departing from the invention which is defined by the accompanying claims. Applicant specifically does not intend for the claims to be interpreted as means plus function claims under 35 USC §112, Paragraph 6.

The invention claimed is:

1. In a system for producing plywood blanks, a veneer sheet feeder comprising:

a first conveyor for conveying veneer sheets along a determined path;

an overhead conveyor conveying individual veneer sheets from a stack of veneer sheets at a position spaced laterally from said determined path to a position overlying said first conveyor;

said overhead conveyor comprising a track extending between said stack and said first conveyor, a carrier mounted to said track and movable along said track between the position of said stack of veneer sheets and said first conveyor;

a support structure, multiple vacuum actuated grippers that are height adjustably supported relative to said support structure and as adjustably supported arranged to fit an uneven surface configuration of a top most veneer sheet of said stack of veneer sheets, suspension members mounting said support structure to said carrier and adapted to raise and lower said support structure independent of the adjustment provided between said support structure and said grippers and accordingly to lower said grippers into gripping engagement with a top sheet of said stack of sheets;

a linear actuator for moving said carrier between the position of the stack and said conveyor; and a control for cooperatively controlling the gripping action of the grippers, the raising and lowering of the support structure, the linear movement of the carrier for repetitively positioning the carrier over the stack of veneer sheets, lowering the grippers and gripping a top sheet of the stack of veneer sheets, transporting the top sheet to the first conveyor and depositing the top sheet onto the first conveyor.

2. A veneer conveyor sheet feeder as defined in claim 1 wherein the linear actuator is servo-powered and belt driven to provide rapid movement of the carrier between the stack and first conveyor.

3. In a system for producing plywood blanks, a multiple of veneer sheet feeders as defined in claim 1 and a corresponding number of veneer sheet stacks including one stack for each veneer sheet feeder, each of said stacks made up of veneer sheets having a common thickness, grade and grain direction and said stacks in combination providing a mix of thickness, grade and grain direction which in combination provide a desired blank construction, said control controlling the multiple veneer sheet feeders for depositing veneer sheets from said stack in sequence as dictated by said desired blank construction.

4. A veneer sheet feeder as defined in claim 3 wherein the grippers are vacuum actuated and as individually conformed to the top surface of the stack producing vacuum sealing engagement for gripping said top sheet.

5. A veneer sheet feeder as defined in claim 4 wherein the grippers are provided with reversible air flow for positive air ejection of the top sheet onto the first conveyor.

6. A veneer sheet feeder as defined in claim 4 wherein the plurality of grippers are arranged in a grid of columns and rows along the length and width of the top sheet to assure adequate gripping of the top sheet.

7. A veneer sheet feeder as defined in claim 1 wherein a scissor support supports the stack of veneer sheets at said laterally spaced position and raises the stack as top sheets are removed to present a substantially consistent height position of subsequent top sheets.

8. In a system for producing plywood blanks, a veneer sheet feeder comprising:
- a first conveyor for conveying veneer sheets along a determined path;
- an overhead conveyor conveying individual veneer sheets from a stack of veneer sheets at a position spaced laterally from said determined path to a position overlying said first conveyor;
- said overhead conveyor comprising a track extending between said stack and said first conveyor, a carrier mounted to said track and movable along said track between the position of said stack of veneer sheets and said first conveyor;
- a support structure, multiple self-adjustable vacuum actuated grippers supported on said support structure and arranged to fit the configuration of a veneer sheet of said stack of veneer sheets, suspension members mounting said support structure to said carrier and adapted to raise and lower said support structure and accordingly to lower said grippers into gripping engagement with a top sheet of said stack of sheets;
- said grippers being vacuum grippers, an air source connected to said vacuum grippers and said air source selectively providing negative and positive air pressure to said vacuum grippers for positive release of the grippers from the top most veneer sheet;
- a linear actuator for moving said carrier between the position of the stack and said conveyor; and
- a control for cooperatively controlling the gripping action of the grippers, the raising and lowering of the support structure, the linear movement of the carrier for repetitively positioning the carrier over the stack of veneer sheets, lowering the grippers and gripping a top sheet of the stack of veneer sheets, transporting the top sheet to the first conveyor and positive air release depositing of the top most sheet onto the first conveyor.

9. In a system for producing plywood blanks, a veneer sheet feeder comprising:
- a first conveyor for conveying veneer sheets along a determined path;
- an overhead conveyor conveying individual veneer sheets from a stack of veneer sheets at a position spaced laterally from said determined path to a position overlying said first conveyor;
- said overhead conveyor comprising a track extending between said stack and said first conveyor, a carrier mounted to said track and movable along said track between the position of said stack of veneer sheets and said first conveyor;
- a support structure, a multiple number of self-adjustable vacuum actuated grippers supported on said support structure and arranged to fit the configuration of a top most veneer sheet of said stack of veneer sheets, said multiple number being greater than required to grip the sheet and thereby accommodate defects in the sheet, suspension members mounting said support structure to said carrier and adapted to raise and lower said support structure and accordingly to lower said grippers into gripping engagement with a top sheet of said stack of sheets;
- a linear actuator for moving said carrier between the position of the stack and said conveyor; and
- a control for cooperatively controlling the gripping action of the grippers, the raising and lowering of the support structure, the linear movement of the carrier for repetitively positioning the carrier over the stack of veneer sheets, lowering the grippers and gripping a top sheet of the stack of veneer sheets, transporting the top sheet to the first conveyor and depositing the top sheet onto the first conveyor.

\* \* \* \* \*